United States Patent [19]

Somerville

[11] 4,224,966
[45] Sep. 30, 1980

[54] CRACK ARRESTOR

[75] Inventor: Francis S. Somerville, Calgary, Canada

[73] Assignee: Northern Border Pipeline Company, Kansas City, Mo.

[21] Appl. No.: 969,477

[22] Filed: Dec. 14, 1978

Related U.S. Application Data

[62] Division of Ser. No. 733,882, Oct. 19, 1976, Pat. No. 4,148,127.

[30] Foreign Application Priority Data

Oct. 20, 1975 [CA] Canada ................................ 238126

[51] Int. Cl.³ ............................................. F16L 9/04
[52] U.S. Cl. .................................. 138/172; 138/103; 138/155; 138/178
[58] Field of Search ............... 138/172, 174, 178, 155, 138/103, 153; 29/523; 405/168

[56] References Cited

U.S. PATENT DOCUMENTS

| | | | |
|---|---|---|---|
| 3,349,807 | 10/1967 | Penman ................................ | 138/172 |
| 3,768,269 | 10/1973 | Broussard et al. ................ | 138/172 X |
| 3,860,043 | 1/1975 | Kutnyak et al. .................. | 138/172 X |

Primary Examiner—Richard E. Aegerter
Assistant Examiner—James E. Bryant, III
Attorney, Agent, or Firm—Kenyon & Kenyon

[57] ABSTRACT

This invention relates to crack arrestors for arresting longitudinal propagation of a crack in pipelines carrying natural gas or highly volatile normally gaseous liquids or combinations thereof, and to methods for applying said crack arrestor to pipelines.

8 Claims, 9 Drawing Figures

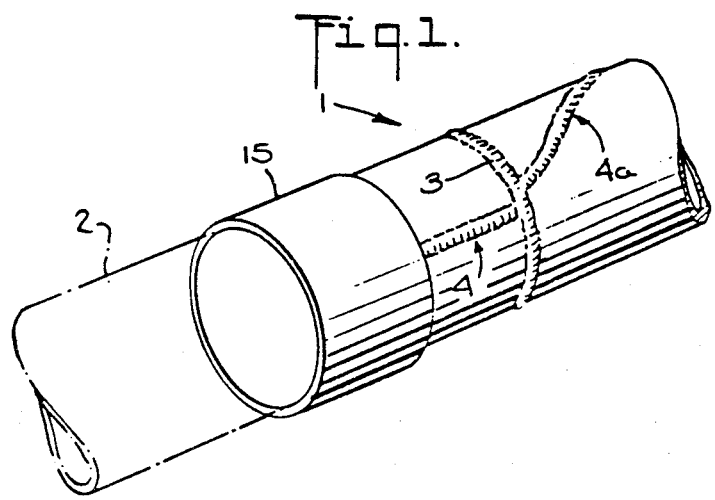

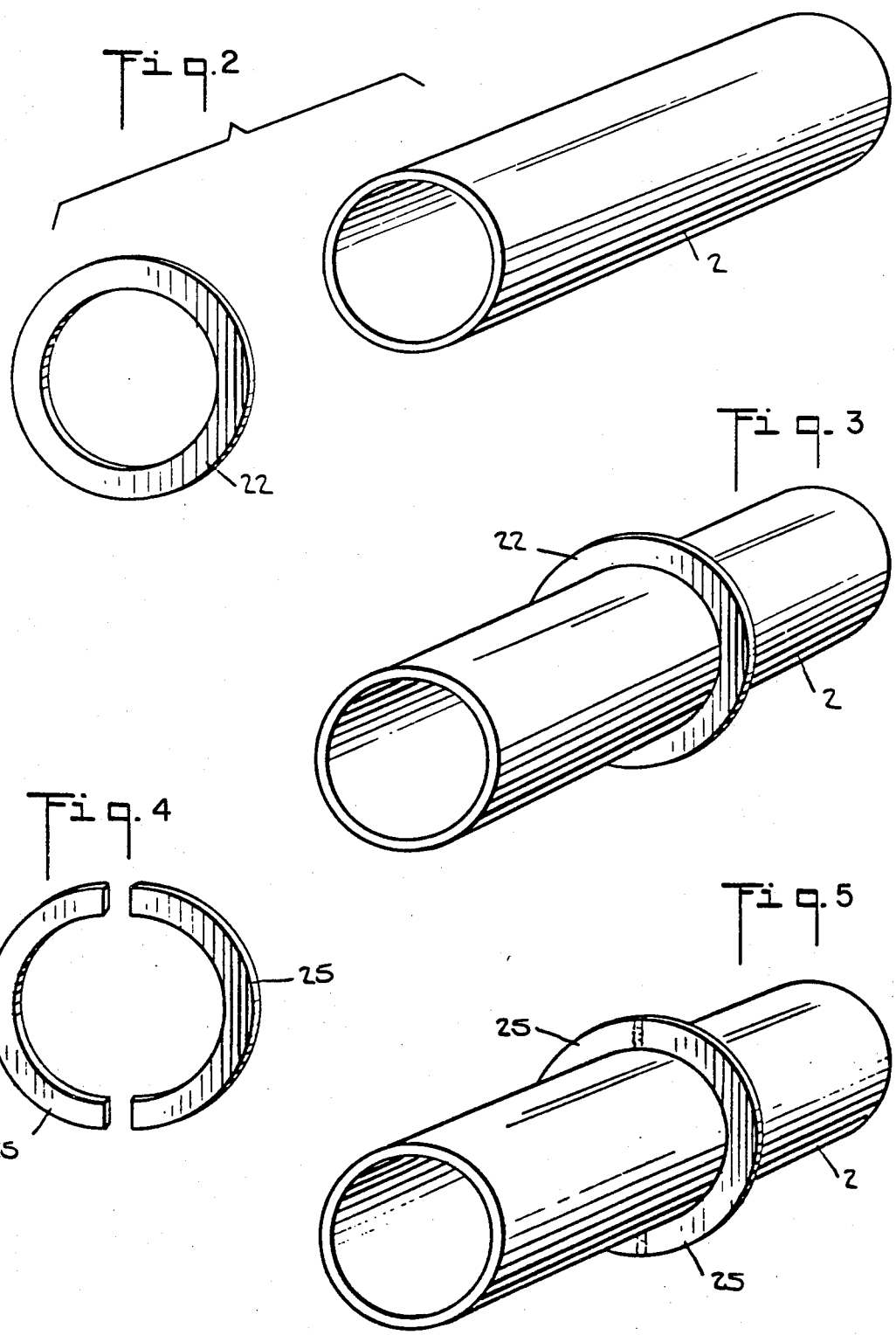

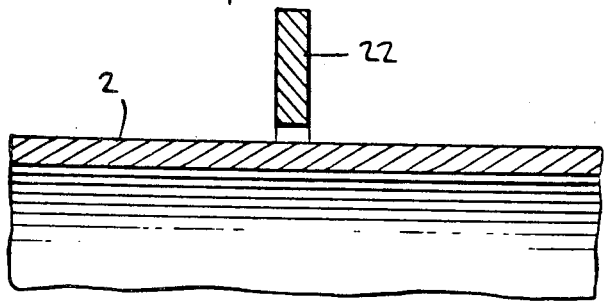
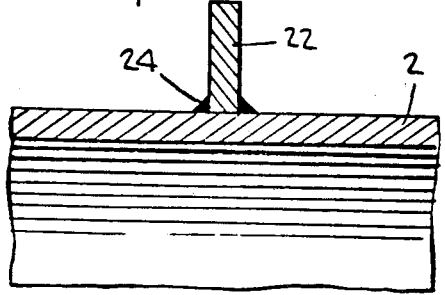
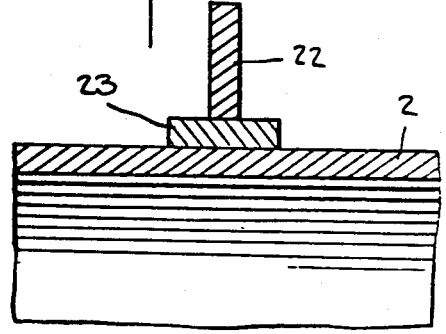
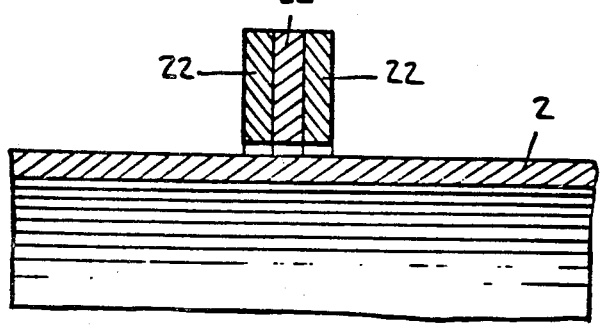

CRACK ARRESTOR

This is a division of application Ser. No. 733,882, filed Oct. 19, 1976, now U.S. Pat. No. 4,148,127.

BACKGROUND OF THE INVENTION

It has been determined that pipelines carrying fluids such as natural gas, liquid gas, or liquid-gas phases are subject to splitting or cracking as a result of both external and internal events that locally stress the wall of the pipe beyond the stress level sustainable by the material of the pipe. If the split or crack is of any significant length, it will not merely remain static but it will propagate longitudinally in the pipeline at high velocity in both directions away from the initial split. For certain temperature conditions, the crack may propagate along the pipeline made of material such as mild steel, as a ductile crack opening the pipe up longitudinally generally along a line at the top of the pipeline while under other temperature conditions, the crack may propagate as a brittle crack as it travels along the pipeline. In contrast to the ductile crack propagation wherein the pipe actually opens up the brittle crack appears simply as a crack or a network of cracks without significant pipe distortion. The velocity of a ductile crack may vary from about 200 to about 1,000 feet per second while the brittle crack will propagate at greater speeds, e.g. of the order of 1,300 to 3,000 feet per second. In both cases, the speed of propagation unless such propagation is in someway inhibited, the speed of propagation is greater than or the same as the velocity of the critical driving pressure wave of the gaseous or volatile contents of the pipeline, so that in the vicinity of the tip or head of the crack, the internal pressure is sufficient to continue crack propagation until in some manner the fracture is arrested. While the problem of pipeline fracture propagation is not as significant in smaller diameter pipelines carrying lower pressure gas under moderate climatic conditions, the problem becomes a serious one in connection with larger diameter pipelines carrying high pressure gaseous fluid rich in hydrocarbons in extreme climatic conditions and environmental factors which all may be present in, for example, piping natural gas and hydrocarbons from the Arctic.

Regardless of the care taken for obtaining the desired pipe specifications including built-in safety margins to handle the anticipated operating conditions of the pipeline, pipeline cracking, even possibly brittle cracking, cannot be ruled out. Moreover, since pipelines may be employed for transporting natural gas and the like from remote areas such as the Arctic, the damage of fracture propagation over long lengths of pipeline in remote and inaccessible areas is apparent. It is therefore necessary to provide for the arresting of any propagating crack before such crack can propagate over any extensive distance and to achieve such crack arrest in an economical way.

SUMMARY OF THE INVENTION

In approaching the problem of crack arrest, the selection of the specifications of the pipe to be used for the pipeline is made to provide a tough ductile pipe which will substantially preclude brittle fracture and then means are provided at intervals along the pipeline to alter the resistance of the pipeline to the tendency to open up along a line under ductile crack propagation.

For a better understanding of the invention, it may be explained that, whether initiated by internal or external events, it has been determined that a ductile crack involves the opening up of the pipe to an extent of several inches, perhaps 2 to 4 inches within a foot of the crack tip in a 48" pipe and as the pipe opens, stress is created and concentrated in the unopened pipe immediately ahead of the crack, perhaps extending several feet ahead the tip of the crack. This stress concentration exceeds the normal stress level in the pipe and the crack continues to propagate including across the normal welds joining the pipe in end-to-end relation. Because the velocity of propagation of the crack is greater than or equal to the velocity of the critical crack driving pressure of the gas as it escapes from the previously cracked pipe, the crack is driven on and unless it can be stopped or slowed so that the pressure at the tip of the crack is less than the critical crack driving pressure, it will continue to propagate.

It has been determined that if a pipe section presenting a wall capable of withstanding, or dissipating the concentrated stress wave immediately ahead of the propagating ductile crack, or a pipe section having any combination of such properties, is interposed in the path of the crack, the crack can be arrested and/or slowed and subsequently arrested.

It has also been determined that such a pipe section may also be capable of arresting brittle crack propagation should by chance such crack propagation be initiated.

Therefore, a crack arrestor may comprise a pipe section or pipe wall element located along the pipeline having stress resisting characteristics differing from the adjoining pipe length whereby the stress concentration wave ahead of the tip of any propagating ductile crack will at least be dissipated to a lower stress concentration as it attempts to propagate therethrough.

Crack arrestor sections which include or comprise a standard pipe section having an encircling band to restrain the encircled pipe wall from opening up have been disclosed, for example, in U.S. Pat. Nos. 3,870,350 and 3,349,807. Such an encircling band has been applied by welding semi-circular segments or part sections of metal strapping or pipe around a standard pipe section. Other types of crack arrestors, consisting of heavy wall sections of pipe and/or oriented metal grain structures have been proposed, for example, in U.S. Pat. Nos. 3,096,105 and 3,698,746.

In prior art crack arrestors, several disadvantages may be encountered. First, a completely tight seal between the outer pipe wall and the inner surface of the restraining bands may be extremely difficult to obtain. Second, the crack arrestors may require extensive welding or mechanical operations to be performed in the field, which is particularly expensive and difficult under Arctic conditions. Moreover, those crack arrestor means previously known which call for filet welding the arrestor to the pipe may present disadvantages in that filet welds may even promote cracks in the pipeline.

A further type of crack arrestor, disclosed in an Apr. 10, 1974 Bulletin of the Research Laboratory, United States Steel Corporation, (a copy is submitted to the Patent Office herewith) constitutes a brittle girth weld joining segments of pipe in end-to-end relation. This type of crack arrestor, however, presents a risk that the brittle girth weld will fail under normal operating conditions.

In another aspect of the invention, a ring or disc having an inside diameter the same or slightly larger than the outside diameter of the pipe, and having a radial dimension greater than its thickness dimension, comprises a crack arrestor.

These and other objects and features will become apparent from the following detailed description taken in conjunction with the accompanying drawings.

BRIEF DESCRIPTION OF THE DRAWINGS

FIG. 1 illustrates the application of an encircling sleeve applied to a pipe for the purpose of altering the stress concentration resistance of the encircled pipe.

FIGS. 2 and 3 are perspective views illustrating the application of a ring or disc to a pipe section to increase stress concentration resistance.

FIGS. 4 and 5 are perspective views illustrating the application of a ring or disc formed from two halves to a pipe section to increase stress concentration resistance.

FIG. 6 is a broken away longitudinal section showing the ring or disc loosely fitted over the pipe.

FIG. 7 is a view similar to FIG. 6, but showing the ring or disc joined by welding or some other means to the pipe.

FIG. 8 is a view similar to FIGS. 6 and 7, but showing the ring or disc fitted to the pipe with a band.

FIG. 9 is a broken away longitudinal section showing the application of a series of rings or discs to a pipe section to increase stress concentration resistance.

DETAILED DESCRIPTION OF THE DRAWINGS

With reference to FIG. 1, there is shown a pipeline generally designated as 1 made up of pipe sections 2 which are welded in end-to-end relation as at 3. Such pipe sections are normally formed of steel although they may be of other metals such as aluminum. The larger diameter pipes with which the present invention is particularly concerned, e.g. in the range of from 36 to 48 inches, have longitudinal or spiral seams which are welded as indicated at 4 and 4a respectively and each pipe section is normally 40 feet in length, small diameter pipes may be seamless.

FIG. 1 illustrates the application of a band generally designated at 15 applied to one of the pipe sections 2 to alter the stress concentration resistance of the encircled wall portion of the pipe.

The specification of the pipe section 2 is selected to provide a degree of ductility in the pipeline at the operating conditions to which the pipeline may be subjected. In the case of a pipeline for delivering natural gas from the Arctic, the selection of the steel specifications will be such as to provide under Arctic operating conditions, e.g. at a temperature below the perma frost melting temperature, i.e. at a temperature below 32 degrees F., a measure of ductility in the pipeline so that the nature of any crack which may develop as a result of any abnormal external or internal effect will be a ductile crack which will tend to open up the pipe along a line as it propagates along the pipeline.

It will be appreciated as explained that as the concentrated stress wave ahead of the tip of the crack reaches the pipe segment encircled by the band 15, it will see a pipe wall segment which is constrained against opening up. That is, the pipe wall segment within the band 15 has had its stress resistance characteristic altered by the encircling band so as to increase its resistance to opening up and it has found that with encircling band formed for example, of a segment of standard pipe section applied as illustrated in FIG. 1, the resistance to opening up is sufficient to initially slow and then stop the propagating crack within the length of the encircling band. As explained, if the propagation velocity or rate of the propagating crack is impeded or slowed, the internal gas pressure will progressively lower until there is not sufficient stress to drive the crack.

In most instances an encircling band 15 will be sufficient to arrest ductile crack propagation, although as hereinafter further explained, such band may be employed in conjunction with other fracture arrest mechanisms.

While the specifications of the pipeline are chosen to essentially preclude brittle cracking, circumstances may occur which render a portion of the pipeline brittle. Again, since the band 15 is an encircling reinforcement adding to the strength of the underlying pipe wall throughout its periphery, the band also has been found to be effective as a means of arresting brittle crack propagation.

It will be understood that while the band may have the same specification as the standard pipe section, the actual specifications will be determined by the actual operating conditions of the specific pipeline section and the manner in which the band is applied.

FIGS. 2 through 5 illustrate the use of a ring or disc 22 as a means of providing for crack arrest. The crack arrestor consists of a ring or disc having an inside diameter the same or slightly larger than the outside diameter of the pipe, and having a radial dimension greater than the thickness dimension.

Although FIG. 6 shows the disc having some clearance between itself and the pipe wall, it can be more tightly fitting as shown in FIG. 7, filet welded 24 either intermittently or continually as shown in FIG. 7, or placed over the pipe in a loose manner and fitted to the pipe with bands 23 such as shown in FIG. 8. Another configuration is a series of these discs 22 as shown in FIG. 9, either loosely fitted as shown or joined by welding or some other means.

It is possible to place discs of this type around a pipe section or an in-place pipeline by welding together two halves 25 as shown in FIGS. 4 and 5.

The advantages of this disc crack arrestor are that it is a very economical use of material for providing resistance to flap opening compared to the bands or sleeves heretofore suggested. Additionally, the disc has a stiffness which could prevent the ovaling of the pipe which occurs prior to the arrival of a propagating ductile fracture. The use of a multiple number of discs overcomes the problem of achieving the desired metallurgical properties for crack arrest in a thick section, such as a flange. Also, a loose fitting disc may have desirable properties with respect to the stresses in an operating pipeline, particularly as they relate to bending. Further, the configuration shown in FIGS. 4 and 5 provides for the attachment of a crack arrestor with a minimum amount of welding as compared to a plit sleeve or band.

It will be understood that the standard pipe sections for a pipeline of the type for delivering large volumes of pressure gas will be metal and preferably the bands, e.g. band 15 of FIG. 1 will also be of the corresponding metal. However, such bands of other suitable material such as fiberglass may be employed.

Moreover, the space between the band and the pipe section may be filled with a suitable inert material such as a bituminous compound or the space may be filled with a material such as concrete which will transfer load to the band during crack arrest. Furthermore, certain materials such as polyethylene, may perform both of these functions effectively.

It will be understood that within the teachings of the broad aspects of the invention, various alternative arrangements to those particularly depicted and described may be made, without departing from the spirit of the invention or scope of the appended claims.

What is claimed is:

1. A crack arrestor for a large diameter pressurized gas pipepline formed from a plurality of tough ductile steel cylindrical pipe sections joined end to end that undergo radial expansion to an expanded state under normal operating conditions in which the gas internal to the pipeline is brought up to operating pressure, the pipe sections in the expanded state being susceptible to propagating ductile cracks driven by the internal pressure in the pipeline, said arrestor comprising an annular disc having an inside diameter that encircles and fits loosely over a pipeline section in its unexpanded state and that tightly contacts the pipeline section when an ovaling, preceding the advance of the propagating crack, propagates to the location of said disc, said disc having sufficient stiffness to prevent the ovaling in the pipeline from deforming the disc and thereby to retard the velocity of the propagating ductile crack along the pipeline sufficiently to arrest the propagating crack.

2. A crack arrestor according to claim 1 wherein said disc is in nonwelded contact with the pipeline section in its expanded state.

3. A crack arrestor according to claim 1 wherein said disc fits loosely over the pipeline section in its expanded state.

4. A crack arrestor according to claim 1 wherein said disc is in nonwelded contact with a band filling the space between the disc and the pipeline section.

5. A crack arrestor according to claims 1 through 4 wherein said disc has a radial dimension greater than its thickness dimension.

6. A crack arrestor for a large diameter pressurized gas pipeline formed from a plurality of tough ductile steel cylindrical pipe sections joined end to end that undergo radial expansion to an expanded state under normal operating conditions in which the gas internal to the pipeline is brought up to operating pressure, the pipe sections in the expanded state being susceptible to propagating ductile cracks driven by the internal pressure in the pipeline, said arrestor comprising means to encircle and fit loosely over a pipeline section and to tightly contact the pipeline section when ovaling, preceding the advance of the propagating crack, propagates to the location of said means, said arrestor acting to restrain the ovaling in the pipeline and thereby to retard the velocity of propagation of the ductile crack along the pipeline sufficiently to arrest its propagation.

7. A crack arrestor system for a large diameter pressurized gas pipeline formed from a plurality of tough ductile steel cylindrical pipe sections joined end to end that undergo radial expansion to an expanded state under normal operating conditions in which the gas internal to the pipeline is brought up to operating pressure, the pipe sections in the expanded state being susceptible to propagating ductile cracks driven by the internal pressure in the pipeline, said arrestor system comprising a plurality of annular discs each having an inside diameter that encircles and fits loosely over a pipeline section and that tightly contacts the pipeline section when an ovaling, preceding the advance of the propagating crack, propagates to the location of each said disc, each of said discs having sufficient stiffness to prevent the ovaling in the pipeline from deforming the disc and thereby in combination with other discs of the plurality to retard the velocity of propagation of the ductile crack along the pipeline sufficiently to arrest its propagation.

8. A crack arrestor system for a large diameter pressurized gas pipeline formed from a plurality of tough ductile steel cylindrical pipe sections joined end to end that undergo radial expansion to an expanded state under normal operating conditions in which the gas internal to the pipeline is brought up to operating pressure, the pipe sections in the expanded state being susceptible to propagating ductile cracks driven by the internal pressure in the pipeline, said arrestor system comprising a plurality of means to encircle and fit loosely over a pipeline section and to tightly contact the pipeline section when an ovaling, preceding the advance of the propagating crack, propagates to the location of each said means to restrain the ovaling in the pipeline and thereby in combination with other means of the plurality to retard the velocity of propagation of the ductile crack along the pipeline sufficiently to arrest its propagation.

* * * * *